United States Patent [19]

Haase

[11] Patent Number: 4,625,937

[45] Date of Patent: Dec. 2, 1986

[54] LANTERN STAND

[76] Inventor: Gregory W. Haase, 14647 Greenwood Rd., #301, Dolton, Ill. 60419

[21] Appl. No.: 735,111

[22] Filed: May 17, 1985

[51] Int. Cl.⁴ ............................................ F16M 13/00
[52] U.S. Cl. .................................... 248/545; 248/156; 248/159
[58] Field of Search ............... 248/545, 530, 532, 533, 248/159, 156; 40/605, 606, 607, 610, 617; 362/431

[56] References Cited

U.S. PATENT DOCUMENTS

| | | | |
|---|---|---|---|
| 360,577 | 4/1887 | Fisher | 248/303 X |
| 1,297,578 | 3/1919 | Lindstaedt | 248/156 X |
| 2,475,041 | 7/1949 | Mattson | 248/156 UX |
| 2,735,680 | 2/1956 | Ross | 248/303 X |
| 3,199,818 | 8/1965 | Ahara | 248/156 |
| 3,270,480 | 9/1966 | Beecker | 52/726 |
| 3,285,554 | 11/1966 | Voelkerding | 248/156 X |
| 3,318,560 | 5/1967 | Garrette et al. | 52/127.5 X |
| 3,858,833 | 1/1975 | Fink | 248/533 |
| 3,995,796 | 12/1976 | Kline | 248/156 X |
| 4,096,951 | 6/1978 | Menssen | 248/156 X |

FOREIGN PATENT DOCUMENTS 343465 2/1931 United Kingdom ............... 248/156

Primary Examiner—J. Franklin Foss
Attorney, Agent, or Firm—Sabin C. Bronson

[57] ABSTRACT

A pole assembly useful for hanging a lantern or other item by its handle comprises a base to provide an anchor for the pole assembly; a plurality of pole sections connectable end to end to form a pole; an arm associated with the uppermost of the pole sections and extending away from the pole; and a hook associated with the arm and structured so that the handle of the item must be sequentially moved in at least two different latitudinal positions in order to completely disengage the handle from the hook. The design of the pole assembly provides maximum compactness for storage and transportation.

17 Claims, 7 Drawing Figures

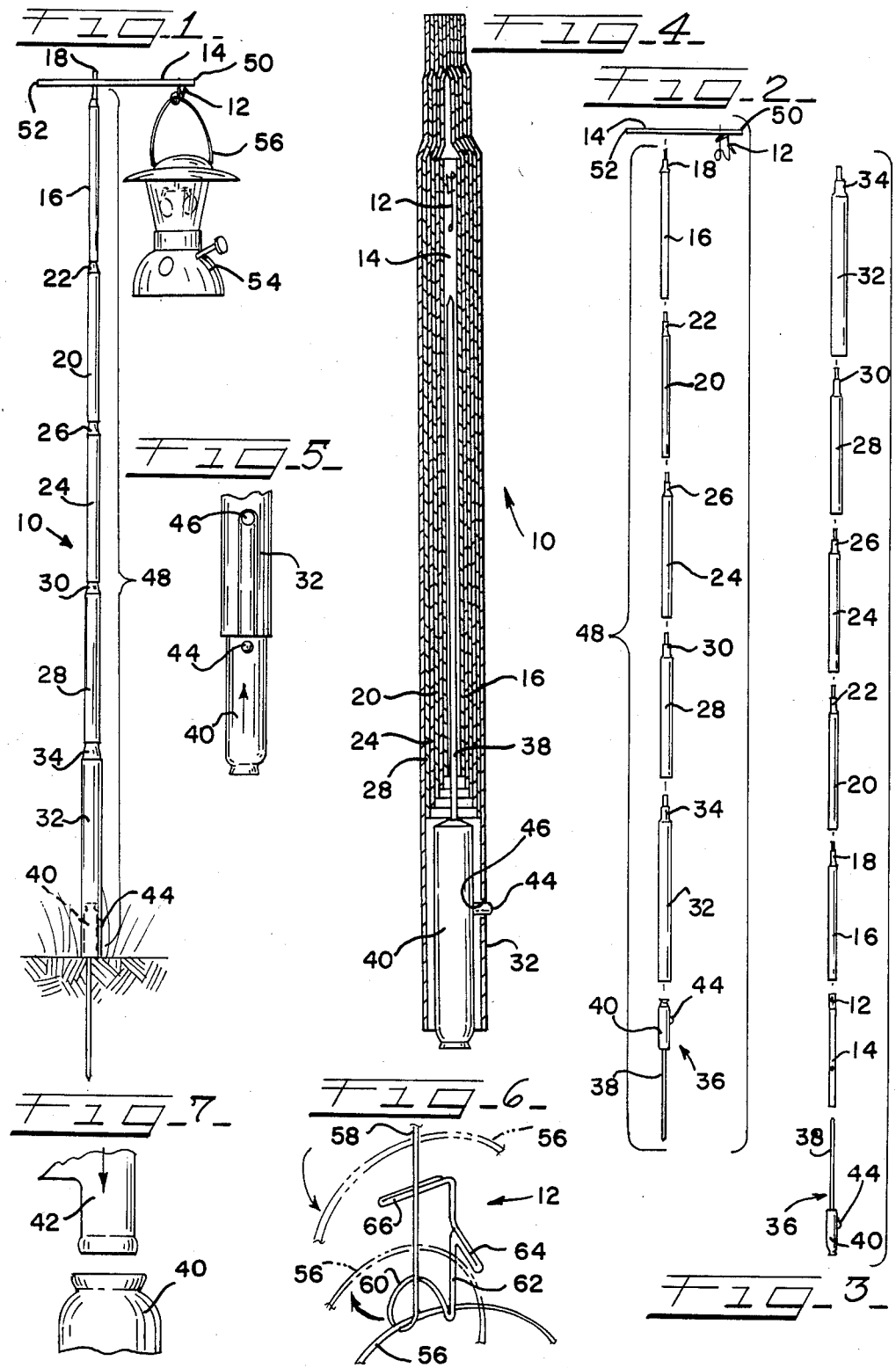

LANTERN STAND

BACKGROUND AND SUMMARY OF THE INVENTION

The present invention relates to pole assemblies. In particular, the present invention relates to pole assemblies useful for holding lanterns or other items by such items' handles.

Campers very often have the need to place a lighted lantern in an elevated position, e. g., to better illuminate the camp site area. Because the lantern usually operates on flammable fuel, the lantern should be held securely in this elevated position. Also, when the "stand" or "pole" for the lantern is no longer needed, it advantageously should be compactly stored and should be ready for quick and easy assembly.

A wide variety of pole assemblies have been suggested previously. See, for example, U.S. Pat. Nos. 1,297,578; 3,199,818; 3,270,480; 3,285,554; 3,318,560; 3,858,833 and 3,995,796. These pole assemblies appear to be relatively complex, for example, requiring various locking mechanisms, etc. Also, some previous assemblies disclose sub-systems designed to keep a removable item (lantern) securely on the pole. However, they require cumbersome manual adjustment. The present design combines security and ease of use. Clearly, it would be advantageous to provide an improved pole assembly.

Therefore, one object of the present invention is to provide an improved pole assembly.

A further object of this invention is to provide a pole assembly which is easy to assemble and disassemble.

A still further object of this invention is to provide a pole assembly which can be compactly stored when not in use.

Another object of this invention is to provide a pole assembiy useful for holding a lantern or other item such that the item is inhibited from disengaging from the pole once the item is placed on the pole. Other objects and advantages of the present invention will become apparent hereinafter.

A pole assembly useful for hanging a lantern or other items by its handle, preferably elongated handle, has been discovered. This pole assembly comprises base means capable of being partially pounded into a solid mass (e. g., the earth) to provide an anchor for the pole assembly; a plurality of elongated pole section means each having a first end and a second end, and each being structured to be connectable end-to-end with at least one other of the pole section means to form a pole, provided that the first end of the lowermost pole section means is adapted to engage that portion of the base means extending out of the solid mass; arm means associated with the uppermost pole section means of the pole and extending away from the pole; and hook means associated with the arm means, being capable of holding the handle of the item, and structured so that the handle must be sequentially moved into at least two different latitudinal positions in order to completely disengage the handle from the hook means.

The structure of the present hook means restricts the item from being accidently disengaged or removed from the pole, for example, by a gust of wind. This provides a substantial safety feature to the present pole assembly. Also, the hook means is preferably structured to inhibit movement of the hung item toward the pole. This adds further to the safety of the present pole assembly. Preferably, the hook means is pivotally associated with the arm means so that the hook means can be rotated toward the arm means away from the pole (e. g., for ease and compactness of storage) and is substantially prevented from rotating more than about 90° toward the arm means in a direction toward the pole. This feature still further reduces the possibility of the hung item coming into contact with the pole.

The hook means preferably includes a spiral structure into which the handle of the item being hung is placed. More preferably, the spiral structure is located and sized so as to inhibit the item from swinging from its handle toward the pole. In this embodiment, the handle is fixed in one position in the spiral structure. The presently preferred spiral structure is another safety feature of this pole assembly.

With regard to disengaging the handle from the pole assembly, the present hook means preferably includes at least one barrier element, more preferably a plurality of barrier elements, situated so that the handle must be moved into a different latitudinal direction in order to pass each individual barrier means. These preferred barrier elements reduce the risk of the item being accidentally removed from the pole.

The second ends of each of the pole section means, other than the uppermost of such pole section means, is preferably tapered so that the first end of the next higher pole section means of the pole can be placed on the second end of the next lower pole section means of the pole. More preferably, the first ends are secured in place on the second ends without additional means to lock the first ends to the second ends. This preferred feature allows for quick and easy assembly-disassembly of the present pole with a minimum ot parts involved.

The second end of the uppermost pole section means is preferably structured and sized to fit through a hole in the present arm means, thereby securing the arm means to the pole. The lowermost pole section means of the pole preferably includes a hole therethrough and that portion of the base means extending out of the solid mass preferably includes a spring loaded projection capable of being fitted into this hole to secure the lowermost pole section means to the base means. Preferably, the average cross-sectional area of the next higher of the pole section means of the pole is decreased relative to the next lower of the pole section means of the pole.

The pole assembly is preferably structured so as to be storable substantially in the lowermost of the pole section means. This allows for compact storage and portability.

The assembly is also durable. For example, the base means is preferably structured to withstand the impact of pounding the base means into the solid mass (e.g., ground) without substantial deforming.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a front elevation view of an embodiment of the present pole assembly shown set up as a pole.

FIG. 2 is a front plan view of the embodiment shown in FIG. 1 blown apart to show how the pole assembly is set up as a pole.

FIG. 3 is a front plan view of certain components of the embodiment shown in FIG. 1 blown apart to show how these components are set up for storage.

FIG. 4 is a front view, partially in cross-section of the embodiment shown in FIG. 1 shown ready for storage.

FIG. 5 is a side plan view of the embodiment shown in FIG. 1 showing how the base and lowermost pole section are engaged.

FIG. 6 is a front side view, in perspective, of the hook of the embodiment shown in FIG. 1.

FIG. 7 is a front plan view of part of the base of the embodiment shown in FIG. 1.

Referring now to the drawings, a pole assembly, shown generally as 10 includes a hook 12 which is pivotally attached to arm 14. Arm 14 has a hole through it toward the end of arm 14 away from hook 12. Uppermost pole section 16 is structured so that the second end 18 of uppermost pole section 16 fits into this hole to thereby secure arm 14 to uppermost pole section 16.

Uppermost pole section 16 is removably attached to second pole section 20 by fitting the double tapered second end 22 of second pole section 20 into the first end of uppermost pole section 16. As can be seen in FIG. 4, uppermost pole section 16, second pole section 20 and the other pole sections (to be described hereinafter) are substantially hollow.

In a similar manner third pole section 24 has a double tapered second end 26 which is fitted into the first end of second pole section 20. Fourth pole section 28 has a double tapered second end 30 which is fitted into the first end of third pole section 24 and lowermost pole section 32 has a double tapered second end 34 which is fitted into the first end of fourth pole section 28.

Pole assembly 10 also includes a base element 36 which in turn includes a spike 38, which is pounded into the ground (as shown in FIG. 1) and upper base 40 which extends above the ground. As shown in FIG. 7, upper base 40 is structured so as to withstand pounding blows by hammer 42 (to drive spike 38 into the ground) without becoming deformed. Upper base 40 also includes a spring loaded button 44 which is structured to fit into hole 46 through lowermost pole section 32. Lowermost pole section 32 is placed on upper base 40 so that spring loaded button 40 fits into hole 46, thereby securing lowermost pole section 32 in place atop upper base 40.

Uppermost pole section 16, second, third and fourth pole sections 20, 24 and 28 respectively, lowermost pole section 32 and base element 36 fitted together as described above form a pole 48. FIG. 2 provides a more detailed illustration how pole 48 is put together. It should be noted that the various pole sections 16, 20, 24, 28 and 32 are fitted together, as described above, without any locking pins or bolts or any other device to keep the sections together. It has been found that the structure of the pole sections 16, 20, 24, 28 and 32, and in particular the double tapered second ends 18, 22, 26, 30 and 34, allows pole sections 16, 20, 24, 28 and 32 and arm 14 to be removably secured together without any other locking means. This provides for simplicity of construction, and ease of assemblibility of pole assembly 10.

As noted above, hook 12 is pivotally attached to arm 14. Such pivotal attachment allows hook 12 to rotate toward outer end 50 of arm 14 so that hook 12 can be substantially aligned with arm 14 for ease of storage, described hereinafter. However, this pivotal attachment of hook 12 to arm 14 is restricted to prevent hook 12 from rotating (from its use position perpendicular to arm 14) toward the other end 52 of arm 14. Thus, when arm 14 is placed atop pole 48, hook 12 is effectively restricted from rotating toward pole 48. This feature inhibits the lantern 54 which is held by hook 12 (as is shown in FIG. 1) from coming into contact with pole 48.

Referring now to FIG. 6, hook 12 is structured so as to hold lantern 54 securely by its elongated handle 56. FIG. 6 shows hook 12 in use, extending downwardly from arm 14. Main rod 58 extends downwardly from arm 14 and forms a spiral structure 60 which is sized and shaped so as to fixedly hold (or cradle) handle 56 of lantern 54. Extending upwardly from spiral structure 60 is a second rod 62 which forms a first barrier element 64 and terminates in a second barrier element 66. First barrier element 64 is situated to be substantially perpendicular to handle 56 when it is being cradled by spiral structure 60. while second barrier means 66 is situated to be substantially parallel to handle 56 when it is being cradled by spiral structure 60. In addition, both first and second barrier elements 64 and 66 extend outwardly at an angle at about 45° from the horizontal.

The structure of hook 12 operates to carry lantern 54 and to inhibit the accidental removal of lantern 54 from hook 12. In order to completely disengage handle 56 (and therefore lantern 54) from hook 12 the following steps must be taken. First, handle 56 must be removed from spiral structure 60. Then, handle 56 must be rotated 90° in the horizontal or latitudinal direction (as shown by the shadow lines in FIG. 6) to move handle 56 past first barrier element 64. Finally, handle 56 must again be rotated 90° in the horizontal or latitudinal direction to move handle 56 past second barrier element 66 This multi-step manipulation required to completely disengage lantern 54 from hook 12 is a substantial safety feature guarding against lantern 54 accidentally falling from or being thrown from hook 12.

In use, spiral structure 60 is located relative to pole 48 so that lantern 54 is effectively prevented from swinging (by handle 56) toward pole 48.

Pole assembly 10 is structured to be easily disassembled and stored. Such disassembly and storage can easily be understood by referring to FIGS. 3, 4 and 5. The components of pole assembly 10 are structured so that spike 38 fits into arm 14 which fits into uppermost pole section 16, which fits into second pole section 20, which fits into third pole section 24, which fits into fourth pole section 28, which fits into lowermost pole section 32. Also a substantial portion of upper base 40 is fitted into lowermost pole section 32, as shown in FIG. 4. During storage spring loaded button 44 of upper base 40 is made to extend out of hole 46 in lowermost pole section 32, thereby locking the components of pole assembly 10 in place during storage. The fitting together of the components of pole assembly 10, as described above, allows pole assembly to be easily disassembled and compactly stored.

While this invention has been described with respect to various specific examples and embodiments, it is to be understood that the invention is not limited thereto and that it can be variously practiced within the scope of the following claims.

What is claimed is:

1. A pole assembly useful for hanging an item by its handle comprising base means including a spike portion capable of being pounded into a solid mass to provide an anchor for said pole assembly; a plurality of elongated pole section means each having a first end and a second end, each of said pole section means being structured to be connectable end-to-end with at least one other of said pole section means to form a pole, provided that the first end of the lowermost of said pole section means is adapted to engage that portion of said base means extending out of said solid mass; arm means associated with the uppermost of said pole section means of said pole and extending away from said pole; and hook means associated with said arm means and being capable of holding said handle of said item, provided that the average cross-sectional area of the next higher of said pole section means of said pole is decreased relative to the next lower of said pole section means of said pole, and provided further that said assembly is structured so that said spike portion, said pole section means other than said lowermost pole section means, said arm means and said hook means are storable in said lowermost pole section means.

2. The assembly of claim 1 wherein said hook means is structured to inhibit movement of said item toward said pole.

3. The assembly of claim 1 wherein said hook means is pivotably associated with said arm means so that said hook means can be rotated toward said arm means away from said pole and is substantially prevented from rotating more than about 90° toward said arm means in a direction toward said pole.

4. The assembly of claim 1 wherein said hook means is structured so that said handle must be sequentially moved into at least two different latitudinal positions in order to completely disenage said handle from said hook means, and said hook means includes a spiral structure into which said handle of said item is placed.

5. The assembly of claim 4 wherein said spiral structure is located and sized so as to inhibit said item from swinging from said handle toward said pole.

6. The assembly of claim 4 wherein said hook means includes at least one barrier element situated so that said handle must be moved into a different latitudinal direction in order to pass said barrier element.

7. The assembly of claim 4 wherein said hook means includes at least one barrier element situated so that said handle must be moved into a different latitudinal direction in order to pass said barrier element.

8. The assembly of claim 4 wherein said hook means includes a plurality of barrier elements each of which is situated so that said handle must be moved into a different latitudinal direction in order to pass each said barrier element.

9. The assembly of claim 5 wherein said hook means includes a plurality of barrier elements each of which is situated so that said handle must be moved into a different latitudinal direction in order to pass each said barrier element.

10. The assembly of claim 9 wherein said hook means includes two barrier elements.

11. The assembly of claim 1 wherein said second ends of each of said pole section means of said pole, other than said uppermost pole section means is tapered so that said first end of the next higher pole section means of said pole can be placed on said second end of the next lower pole section means of said pole.

12. The assembly of claim 11 wherein said first ends are placed on said second ends and secured in place without additional means to lock said first ends to said second ends.

13. The assembly of claim 1 wherein the lowermost pole section means of said pole includes a hole therethrough and that portion of said base means extending out of said solid mass includes a spring loaded projection capable of being fitted into said hole to secure the lowermost pole section means of said pole to said base means.

14. The assembly of claim 1 wherein said assembly is structured so as to be storable substantially in the lowermost of said pole section means.

15. The assembly of claim 13 wherein said assembly is structured so as to be storable substantially in the lowermost of said pole section means.

16. The assembly of claim 1 wherein said base means is structured to withstand the impact of pounding said base means into said solid mass without substantial deforming.

17. The assembly of claim 1 wherein said second end of said uppermost of said pole section means of said pole is structured and sized to fit into a hole in said arm means, thereby securing said arm means to said pole.

* * * * *